H. STAPFER
Apparatus for Testing Lubricants.
No. 154,922. Patented Sept. 8, 1874.
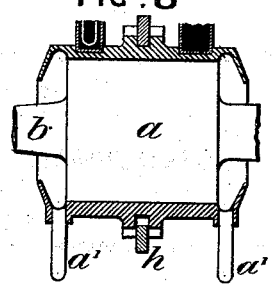
FIG. 3
FIG. 1
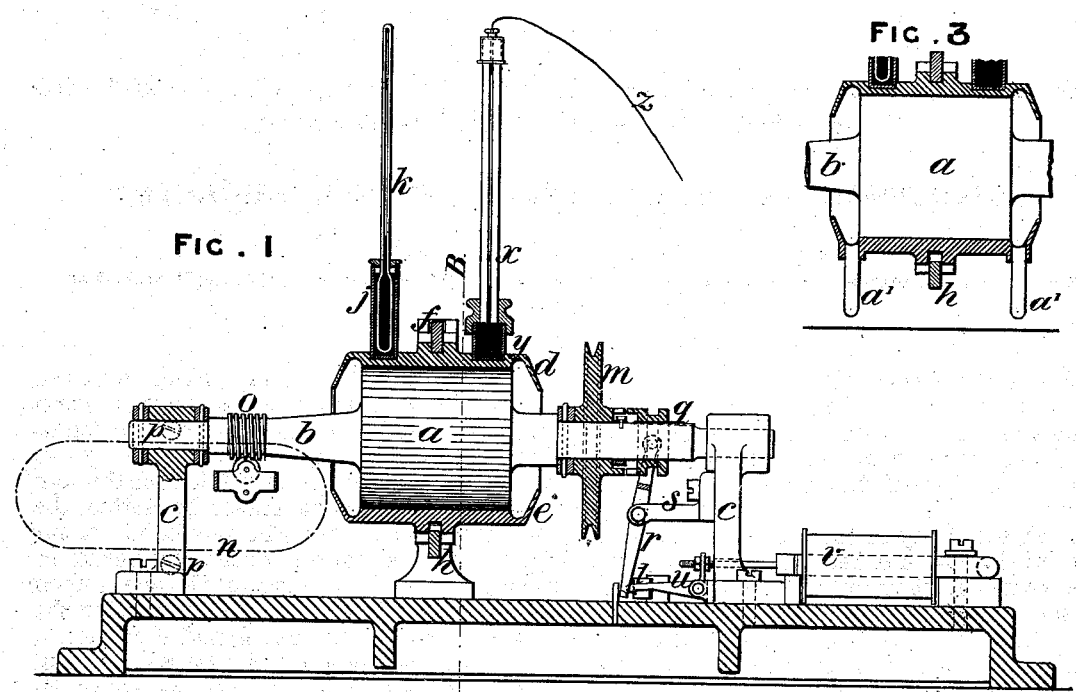
FIG. 4
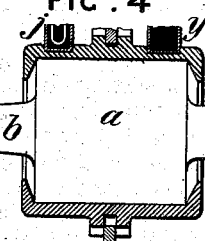
FIG. 2
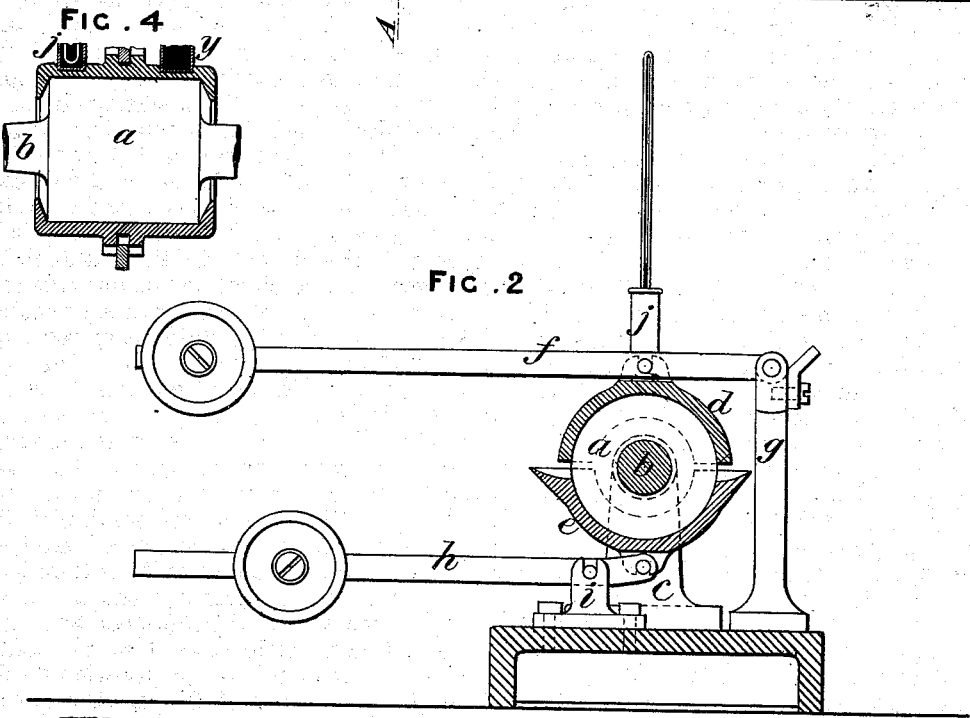
Witnesses
Edward K. Dutton
E. Donhor
Inventor
Heinrich Stapfer

UNITED STATES PATENT OFFICE.

HEINRICH STAPFER, OF MANCHESTER, ENGLAND, ASSIGNOR TO EDWARD H. ASHCROFT, OF BOSTON, MASSACHUSETTS.

IMPROVEMENT IN APPARATUS FOR TESTING LUBRICANTS.

Specification forming part of Letters Patent No. 154,922, dated September 8, 1874; application filed May 18, 1874.

*To all whom it may concern:*

Be it known that I, HEINRICH STAPFER, of Manchester, in the county of Lancaster, England, have invented an Apparatus for Testing Lubricants, of which the following is a specification:

The object of my invention is to test oil or other lubricants, in order to ascertain the relative values of their lubricating properties; and this I accomplish by submitting a sample of the lubricant to be tested to the action of cylindrical fixed and rotating surfaces, the apparatus being constructed to indicate the number of revolutions and the heat generated by friction. The value of the lubricant is determined by the number of revolutions required to effect a certain elevation in the temperature of parts of the apparatus.

The apparatus is illustrated in side elevation, partly in section, by Figure 1 of the drawings, Fig. 2 being a vertical section on the line A B. Figs. 3 and 4 illustrate modifications which may be made in the apparatus.

A block, $a$, truly turned into a cylindrical form, is fixed or formed upon the spindle $b$, which is mounted in bearings in the standards $c\ c$. Two shells, $d$ and $e$, are bored and finished to fit the cylinder $a$. The upper shell, $d$, is pressed downward against the cylinder $a$ by the weighted lever $f$, which is jointed to the upper end of the standard $g$, and the lower shell, $e$, is pressed upward by the weighted lever $h$, which rests upon a fulcrum at $i$, pins in the levers engaging with slots formed in lugs on the shells, and preventing the shells from revolving with the cylinder $a$. A metal cistern, $j$, to contain mercury, is fixed to the upper shell, $d$, and the bulb of a thermometer, $k$, is immersed in the mercury in the cistern, the said mercury serving to establish a metallic contact between the bulb and the metal of the shell $d$. A band-wheel, $m$, is mounted on the spindle $b$, and a "counter" (indicated by the dotted lines $n$) is attached to the apparatus. As the said counter may be of any usual or suitable construction, so long as it is capable of indicating the number of revolutions performed by the spindle $b$, it has not been considered necessary to exhibit it more fully. In the example, motion is imparted to the counting apparatus by the worm $o$, which is formed on the spindle $b$, which engages with a worm fixed on a spindle of the counter. The counter may be attached to the standard $c$ by two screws (indicated at $p\ p$;) and if the hole through which the lower screw passes be slotted, the worm-wheel may readily be moved into or out of gear with the worm $o$, when the lower screw is slackened. The pressure of the shells upon the cylinder may be adjusted by shifting the weights on the levers $f$ and $h$; and, if preferred, springs may be substituted for the said weights.

The apparatus may be used as above described, or it may be provided with the parts next to be described, in which case the band-wheel $m$ is fitted to revolve loosely on the spindle $b$, and to engage with a sliding clutch, $q$, through which motion is imparted to the said spindle. The sliding clutch is thrown into and out of gear with the band-wheel by means of the fork-lever $r$, which is mounted on a stud carried by the bracket $s$, and is acted upon by a spring, $t$, which tends to throw the clutch out of gear. A catch formed on one arm of a bell-crank lever, $u$, engages with a projection on the lever $r$ when the clutch is in gear, and thereby retains it in gear, and the other arm of the bell-crank lever is connected with the armature of an electro-magnet, $v$, the arrangement being such as that, so long as the armature is not attracted by the magnet, the clutch remains in gear, and the cylinder $a$ continues to revolve. A battery is connected with the magnet and with the upper end of a thermometer, $x$, in such a manner as that the glass tube of the thermometer forms a break in the circuit. The mercury of the thermometer is contained in a metal cistern, $y$, which is fixed to the shell $d$; and when the exhaustion of the lubricating properties of the oil or other lubricant causes the said shell to overheat, the mercury rises in the tube until it touches the end of the wire $z$, which projects into the tube. The mercury then serves to make the circuit, and the armature is attracted, whereby the catch is raised from the projection on the lever $r$, and the spring $t$ forces back the said lever, and the clutch is thereby disengaged, and the rotation of the cylinder $a$ ceases. When this self-acting stopping arrangement is applied, the thermometer $k$ may be dispensed with; or, if the thermometer $x$ be not graduated, the thermometer $k$ may be retained for reference.

To simplify the apparatus the electro-magnet may be dispensed with, and the clutch be thrown out of gear by hand.

In Fig. 1 it will be seen that the shells $d$ and $e$ are so formed as that when a sample of lubricant is poured into the lower shell the excess is permitted to escape from between the surfaces of the shells and of the cylinder $a$. If the lower shell be provided with graduated glass tubes to receive this excess, as indicated by $a'\ a'$ in Fig. 3, the amount of lubricant actually tested may be estimated. When the lubricant is specially intended for use in bearings which retain oil, I prefer to make the shells to retain the lubricant, as indicated in Fig. 4.

I claim as my invention—

The revolving cylinder $a$, the shells $d$ and $e$, pressed against the cylinder, combined with a thermometer with mercurial cistern, and with a counting apparatus, substantially as and for the purpose herein set forth.

HEINRICH STAPFER.

Witnesses:
EDWARD K. DUTTON,
C. DONHOE.